(12) United States Patent
Wong

(10) Patent No.: US 6,399,191 B1
(45) Date of Patent: Jun. 4, 2002

(54) MOISTURE RESISTANT COATED METAL SUBSTRATES

(75) Inventor: Chun Sing Wong, Kingston (CA)

(73) Assignee: Du Pont Canada Inc., Mississauga ( * ) Notice: Subject to any disclaimer, the term of this patent is extended or adjusted under 35 U.S.C. 154(b) by 0 days.

(21) Appl. No.: 09/403,337

(22) PCT Filed: Apr. 28, 1998

(86) PCT No.: PCT/CA98/00407

§ 371 (c)(1),
(2), (4) Date: Feb. 23, 2000

(87) PCT Pub. No.: WO98/49245

PCT Pub. Date: Nov. 5, 1998

Related U.S. Application Data

(60) Provisional application No. 60/044,364, filed on Apr. 29, 1997, and provisional application No. 60/046,333, filed on May 7, 1997.

(51) Int. Cl.$^7$ .............................. B32B 15/04; B32B 7/12
(52) U.S. Cl. .................. 428/344; 428/343; 428/351; 428/355 R; 427/409; 427/407.1
(58) Field of Search .................. 428/344, 343, 428/351, 355 R; 427/409, 407.1

(56) References Cited

U.S. PATENT DOCUMENTS

| | | | |
|---|---|---|---|
| 3,868,433 A | 2/1975 | Bartz et al. | 260/876 R |
| 3,987,122 A | 10/1976 | Bartz et al. | 260/836 |
| 4,370,388 A | 1/1983 | Mito et al. | 428/461 |
| 4,670,349 A | 6/1987 | Nakagawa et al. | 428/516 |
| 4,957,968 A | 9/1990 | Adur et al. | 525/74 |
| 5,130,375 A | 7/1992 | Bernard et al. | 525/278 |
| 5,227,426 A | 7/1993 | Tse et al. | 524/534 |
| 5,248,808 A | 9/1993 | Bernard et al. | 560/160 |
| 5,331,049 A | 7/1994 | Audett et al. | 525/100 |

FOREIGN PATENT DOCUMENTS

| | | | |
|---|---|---|---|
| EP | 0 011 474 A1 | 5/1980 | C09J/3/14 |
| EP | 0 091 807 A1 | 10/1983 | C09J/7/02 |
| EP | 0 479 457 A1 | 4/1992 | C09D/151/06 |
| EP | 0 495 996 A1 | 7/1992 | C08L/23/04 |
| EP | 0 507 557 A1 | 10/1992 | C09J/123/04 |
| EP | 0 791 628 A1 | 6/1997 | C08L/23/08 |
| WO | WO 94 12581 | 6/1994 | C09D/151/06 |

OTHER PUBLICATIONS

Patent Abstracts of Japan, Pub. No. 02292347, published Dec. 3, 1990 for Vibration–Damper Composition and Vibration–Damping Laminate (Ube Ind Ltd).

Primary Examiner—Duc Truong

(57) ABSTRACT

The present invention relates to coated metal substrates such as metal piping having improved environmental stress crack resistance and resistance to hydrolytic and/or cathodic disbondment. The coating composition contains a blend of modified and unmodified polyolefins as well as a tackifier. For cathodic disbondment resistance, the preferred tackifiers are rosin esters or hydrogenated versions thereof. The modified polyolefins are grafted versions of metallocene or non-metallocene produced low density or high density polyethylenes.

8 Claims, No Drawings

MOISTURE RESISTANT COATED METAL SUBSTRATES

This application claims the benefit of U.S. Provisional Application No. 60/044,364, filed Apr. 29, 1997, and U.S. Provisional Application No. 60/046,333, filed May 7, 1997.

BACKGROUND OF THE INVENTION

1. Field of the Invention

The present invention relates to moisture resistant coated metal substrates. The metals are typically steel or other structural metals which are formed into piping or other metal fabricated parts which are subsequently exposed to the elements including, for example, moisture.

2. Description of Related Art

Coatings or polymeric layers on metal surfaces are generally known. The coatings may typically serve some kind of protective function to prevent the metal surface from degrading and/or to retain or keep liquids in/out of the fabricated metal element. In order to function properly, the coatings must adhere to the metal or metal surface.

Adhesive compositions are also known which form layers or coatings for multilayer elements to adhere, for example, non-polar material such as polyolefins to polar material or substrates such as metals. In particular, such adhesive compositions are utilized in multilayer elements for packaging food, liquids and the like. These adhesive compositions may contain various polyolefins selected from, for example, polyethylenes or polypropylenes, which are further reacted with a grafting reagent selected from a polar substance such as maleic anhydride. The post-grafted polymeric material and/or blends with ungrafted material is then utilized as an adhesive composition or film and is coextruded between structural and barrier layers to form a suitable package or bottle.

These adhesive compositions can further contain additional excipients or ingredients to provide additional performance characteristics to the polymeric film. For example, PCT publication WO 95/20487 discloses the addition of a tackifier to the particularly recited adhesive composition along with various other active ingredients which include a modified polypropylene, a crystalline ethylene copolymer and an elastomeric component. EPO 507,557 A1 discloses blends of polyethylenes; grafted polyethylenes and tackifiers for adhesion to EVOH and paper.

Other compositions are known which are utilized to bond to the surfaces of metal substrates. See, for example, U.S. Pat. No. 4,500,577 or Japanese patent 85023026. EPO 479 457 A1 discloses polyolefin compositions suitable for bonding to metals or polyamides or EVOH and to polyethylene to form layered pipes or multilayered structures. Blends of grafted HDPE and other polyolefins of different densities are described as particularly suitable for bonding to metal. There is no teaching of a tackifier in said composition. JP-89-74015 discloses pipe coating compositions containing certain modified polymers, non-crosslinked rubbers, elastomers and a tackifier selected from a terpene-phenol copolymeric resin; and asphalt.

U.S. Pat. No. 4,337,297 discloses a coextrudable thermoplastic composition comprising blends of a copolymer of ethylene with a lower alkyl acrylate or methacrylate or vinyl acetate; a chlorinated ethylene polymer and an optional tackifying resin.

EPO 091 807 B1 discloses a heat sealing tape composition for bonding heat-sealable belt shaped covering sheets which are wrapped around the joint portions of steel pipes to protect these joints. The heat sealing tape composition comprises a tape-substrate and a heat bonding layer consisting essentially of a) an ethylene propylene copolymer as described therein, b) a maleic modified polyethylene; c) a polyethylene; d) a tackifier and e) an inorganic filler. This tape is not bonded to metal but is, instead, bonded to the polymeric covering sheet.

U.S. Pat. No. 3,868,433 discloses hot melt adhesive compositions and further states that a typical class of hot melt adhesive compositions utilizes polyolefin polymers as the base or carrier material which is usually blended with other polymers and copolymers, resin tackifiers and with modifiers and additives. A serious short coming of these adhesives is their lack of strong adhesion to metals. This patent teaches one way to improve adhesion to metals is to add grafted or modified polyolefin components. However, there is only a single species actually disclosed—a 60/40 blend of a modified polypropylene grafted with 6 wt. % acrylic acid and an ethylene/propylene/diene monomer elastomer.

U.S. Pat. No. 3,492,372 discloses a hot melt adhesive composition comprising random ethylene/propylene copolymers and certain resin tackifiers and carrier polymers such as polyethylene or polypropylene wherein the composition does not include unsaturated elastomers susceptible to oxidation and degradation.

U.S. Pat. No. 4,670,349 discloses adhesive resin compositions comprising a) ethylene vinyl acetate copolymers or ethylene/alpha olefin random copolymers; b) modified polyethylene and c) a hydrogenated aromatic petroleum resin in which at least 70% of the aromatic ring is hydrogenated. There is no teaching of a metal substrate or said substrate with an adhesive layer.

U.S. Pat. No. 5,405,894 discloses a corrosion protection composition for the undercoating of motor vehicles which comprises a thermoplastic elastomeric block copolymer, a sulphonate of an alkaline earth metal, a tackifier resin and an optional plasticizer.

There is a continuous need for coatings and/or layers on metal surfaces which provide the necessary protective/barrier functions and which are durable and long lasting in terms of adherence properties. The present inventors have solved the problem of moisture penetration through protective adhesive coatings on metal surfaces by discovering a particularly effective adhesive coating composition which is durable, protective and with sufficient moisture barrier properties. This coating composition is applied to a metal substrate to form the coated metal substrate of the invention. The coating composition provides excellent corrosion resistance, environmental stress crack resistance and significantly improved resistance to disbondment in an aqueous or moist environment. The coating compositions having a particular class of tackifiers, the rosin esters and hydrogenated versions thereof, have significantly improved resistance to cathodic disbandment. Furthermore, the coating composition does not require elastomers, rubber, inorganic fillers or asphalt. In addition, the present composition does not require the addition of chlorinated polymers or copolymers of ethylene with vinyl acetate or lower alkyl acrylates or methacrylates.

BRIEF SUMMARY OF THE INVENTION

The present invention broadly relates to a coated metal substrate comprising:

(a) an adhesive coating composition consisting essentially of (i) a modified polyolefin optionally containing at least one additional modified or unmodified polyolefin and (ii) at least one tackifier; and (b) a metal substrate; wherein, for element (a), the tackifier is present in a weight percentage relative to the combined weight of (i) plus (ii) of about 15 to 25% and the modified polyolefin also contains at least one additional unmodified polyolefin.

A method of improving the environmental stress crack resistance of a coating composition, comprising (a) adding a tackifier to a metal coating composition comprising a modified polyolefin optionally containing at least one additional modified or unmodified polyolefin or to a non-metal coating composition comprising a modified polyolefin optionally containing at least one additional modified or unmodified polyolefin to form a composition consisting essentially of the modified polyolefin optionally containing at least one additional modified or unmodified polyolefin and the tackifier wherein said tackifier improves the environmental stress crack resistance of the coating composition according to ESTM D-1693.

DETAILED DESCRIPTION

As summarized above, the present invention relates to coated metal substrates having improved moisture disbandment properties as well as environmental stress crack resistance ("ESCR"). The addition of a tackifier to a modified polyolefin optionally blended with at least one unmodified polyolefin surprisingly led to an increase in ESCR when the opposite effect would be expected—a low molecular weight compound such as the tackifiers recited herein would be expected to cause a decrease in ESCR since normally increasing molecular weight (decrease in MI or more flow) leads to improved ESCR. In addition, the addition of the tackifier led to an increase in MI which correlates with an increase in melt flow so that the composition of the invention leads to an increase in both ESCR and in melt flow.

The metal coating composition consists essentially of (i) a modified polyolefin optionally containing at least one additional modified or unmodified polyolefin and (ii) a tackifier.

The term "unmodified polyolefin" refers to a homopolymer of ethylene or propylene or other alkylene polymeric chain and further means copolymers of an ethylene and a $C_3$–$C_8$ alpha olefin or copolymers of ethylene and vinyl acetate, alkyl acrylate or alkyl methacrylates. The term also includes terpolymers having three distinct monomeric polyolefinic units. The term additionally includes those unmodified polyolefins specifically exemplified herein. Preferably, the unmmodified polyolefin is selected from an ethylene/butene/propylene terpolymer, an ethylene/octene copolymer, an ethylene/butene copolymer, an ethylene/butene/octene terpolymer or an ethylene/hexene copolymer or mixtures thereof.

The term "grafted polyolefin" or "modified polyolefin" refers to those polyolefins which are the products of the reaction between a base polyolefin and a grafting reagent. The base polyolefin is selected from at least one of a homopolymer of ethylene, a homopolymer of propylene, copolymers of ethylene and propylene, terpolymers of ethylene, propylene and dienes (e.g., EPDM etc.) or a copolymer of ethylene with at least one of a $C_3$–$C_8$ alpha olefin, vinyl acetate or alkyl methacrylate or acrylate. The alpha olefins are selected from, for example, butene-1, hexene-1 or octene-1. The alkyl groups on the methacrylate or acrylate esters include, for example, methyl, ethyl, propyl and butyl. The copolymers may include both linear low density polyethylene (LLDPE) and very low density polyethylene (VLDPE).

The grafting reagent or grafting monomer is at least one monomer selected from ethylenically unsaturated carboxylic acids or anhydrides including derivatives or mixtures thereof. Examples of these acids and anhydrides which may be mono- or dicarboxylic acids are, for example, acrylic acid, methacrylic acid, maleic acid, fumaric acid, itaconic acid, crotonic acid, itaconic anhydride, maleic anhydride, and substituted maleic anhydride, e.g., dimethyl maleic anhydride or citraconic anhydride, nadic anhydride, nadic methyl anhydride and tetrahydrophthalic anhydride, maleic anhydride being especially preferred. Techniques or processes for grafting monomers onto a polyolefin chain are well known and are described in, for example, U.S. Pat. No. 4,612,155 or in EPO 398,604. In addition, many such modified polymers are available commercially from, for example, E.I. du Pont de Nemours and Company. The relative weight percentage of the grafting monomer is generally up to 5 wt. % based on the total weight of the modified polymer or the modified polymer and unmodified polymer (total polymer blend). The preferred weight percentage is generally less than 5 wt. % and is most preferably about 1 wt. %. The modified polyolefin is preferably selected from, for example, a LLDPE (0.920 g/cc) grafted with 0.9% maleic anhydride (MI=11); a HDPE (0.956 g/cc) grafted with 1.0% maleic anhydride (MI=11); a LLDPE (metallocene produced, 0.917 g/cc) with 1% maleic anhydride (MI=5) or a LLDPE (0.920 g/cc) grafted with 1.0% maleic anhydride (MI=3). Specifically, the modified polyolefin may be selected from a maleic anhydride grafted conventional or metallocene linear low density polyethylene or from a maleic anhydride grafted conventional or metallocene high density polyethylene. Of course, the densities and MIs may vary considerably. As indicated above, the choice of pre-graft polyolefin includes those polymers made using the range of known catalysts including conventional catalysts or metallocene catalysts. These processes are well known to those in the art. Metallocene produced polymers are commercially available from DOW CHEMICAL COMPANY or from EXXON CHEMICAL.

The density distinguishing abbreviations HDPE, LLDPE, VLDPE and ULDPE are used for 'linear' as distinct from highly branched (short and long chain) LDPE made by free-radical polymerization. Originally, before the advent of metallocene catalysts, the above abbreviations referred to resins made using Ziegler-Natta type catalysis. However, the abbreviations are now often also used for resins made by metallocene catalysis as well.

In this disclosure where it is necessary to make the distinction, resins made by Ziegler-Natta type catalysis will be referred to as conventional-HDPE, conventional-LLDPE, conventional-VLDPE and conventional-ULDPE. Otherwise, it is understood that resins referred to as HPDE, LLDPE, VLDPE and ULDPE include resins manufactured by both Ziegler-Natta or metallocene catalysis.

Density ranges differ in the literature. Generally, the density ranges are: HDPE greater than 0.935 g/cc, LLDPE from greater than 0.91 to 0.935 g/cc and VLDPE and ULDPE from 0.85 to 0.91 g/cc. VLDPE is sometimes included as a subset in the category LLDPE, the density range for the latter going down to 0.85. To avoid confusion, resins at or below 0.91 g/cc will always be referred to as VLDPE. LDPE in this disclosure is free radical polymerized polyethylene having a density from 0.91 to 0.935 g/cc.

The LLDPE, VLDPE and ULDPE disclosed herein are produced by copolymerizing ethylene with alpha-olefin selected from the group consisting of propylene, butene-1, pentene-1, hexene-1, 4-methyl pentene-1, heptene-1, octene-1, etc. The density will depend on a large part on the amount and type of alpha-olefins used as the comonomer. Thus, HDPE may also contain small amounts of alpha-olefin as the comonomer.

Metallocene polyethylenes are more uniform in various composition-related aspects than Ziegler-Natta polyethylenes. The molecular weight distribution is narrow compared with that of conventional-HDPE, conventional-LLDPE and conventional-VLDPE. Furthermore, the alpha-olefin comonomer is introduced in a far more uniform way, both along any given chain and from chain to chain, so that the short-chain branching distribution is narrow. In certain metallocene polyethylenes, it has been found possible to have a small amount of long-chain branching which, because of its uniform positioning along the polymer chains and from chain to chain, allows the molecular weight distribution to be narrow, yet changes the melt rheological behavior, typically making their flow more non-Newtonian over a large range of shear. Metallocene resins can thus be considered as being divided into two groups. The first group are those metallocene resins which contain either no or very low (as distinct from a small amount of) long-chain branching. The second group are those which are believed to contain a small amount of long-chain branching. This latter group corresponds roughly, but not precisely, to those using the same terminology as in U.S. Pat. No. 5,278,272. These groups can be distinguished from each other by two readily measurable parameters, the melt flow ratio and the Mw/Mn ratio. The first group are those which have a I-10/I-2 ratio of less than 6.53 together with an Mw/Mn of greater than (I-10/I-2)– 4.63. The second group are those which have an I-10/I-2 ratio of equal or greater than 6.53 together with an Mw/Mn of equal or less than (I-10/I-2)–4.63.

The conventional polyethylenes can be prepared by well-known Ziegler-Natta methods (e.g., U.S. Pat. Nos. 4,076, 698 and 3,645,992), catalysis in solution, slurry, gas phase or on a support. Metallocene resins may be made using conditions well known in the prior art for continuous polymerization, Ziegler-Natta or Kaminsky-Sinn type polymerization reactions. Suspension, solution, slurry, gas phase or other process conditions may be employed, if desired. A support may be employed, but preferably the catalysts are used in a homogeneous manner.

LDPE is produced by polymerizing ethylene at high pressures and high temperatures and using a free radical initiator, such as a peroxide. The polymer contains substantial amounts of long chain branching, where the branched chains, consisting of ethylene units of various lengths, are pendant of the main polymer chains or of other branched chains.

The unmodified polyethylene may be blends of one or more of the following groups: conventional polyethylenes, LDPE and metallocene polyethylenes and having the density range designations indicated above.

The modified polyethylene is a polyethylene resin, such as described for the unmodified polyethylenes above, which has been further modified with unsaturated carboxylic acids or its derivatives. The grafting monomer is selected from the group consisting of ethylenically unsaturated mono- or dicarboxylic acids and ethylenically unsaturated carboxylic acid anhydrides, including derivatives of such acids or anhydrides. Acid grafting agents which are suitable include acrylic acid, methacrylic acid, maleic acid, fumaric acid, nadic acid, itaconic acid, crotonic acid, itaconic anhydride, maleic anhydride and dimethyl maleic anhydride. Examples of suitable derivatives include salts, amides, imides and esters of such acids or anhydrides. Among the acids or anhydrides, which are particularly useful, are maleic acid or maleic anhydride. The method of grafting onto the polyethylenes can be any of the processes well known in the art. For example, grafting can be carried out in the melt without a solvent, as disclosed in European Patent Application 0,266, 994, or in solution or dispersion or in a fluidized bed. Melt grafting can be done in a heated extruder, a Brabender® or a Banbury® mixer or other internal mixers or kneading machines, roll mills and the like. The grafting may be carried out in the presence or absence of a radical initiator, such as a suitable organic peroxide, organic perester or organic hydroperoxide. The grafted polymers are recovered by any method which separates or utilizes the graft polymer that is formed. Thus, the graft polymer can be recovered in the form of precipitated fluff, pellets, powders and the like.

The art of grafting uniformly is well known, and the acid grafted resin should be as uniformly grafted as possible. The acid or anhydride groups generally comprise 0.001 to about 10 weight percent, preferably 0.01 to 5 weight percent, most preferably 0.05 to 3 weight percent of the modified polyethylene resin.

The preferred modified polyolefins as element (i) of the above described coating composition additionally contain at least one unmodified polyolefin selected from a linear low density polyethylene (e.g., an ethylene/butene/octene terpolymer and an ethylene/butene/propylene terpolymer etc.) and additional excipients such as an antioxidant or antioxidant composition and uv stabilizers and other known conventional additives. The density ranges of the additional unmodified polyolefins or base polyolefins preferably ranges from 0.880 g/cc–0.940 g/cc. The preferred MI range for these base polyolefins is from 0.1–30.

Tackifiers

In addition to the components specified above, the metal coating composition contains a low molecular weight tackifier which surprisingly provides improved ESCR and significantly improved resistance to disbandment under aqueous or moist environmental conditions that the coated metal substrate of the invention is subjected to under normal use conditions. The preferred tackifiers are selected from hydrocarbon tackifiers and rosin ester tackifiers. The range of preferable tackifiers include those selected from aliphatic resins; hydrogenated mixed aromatic resins; mixed aromatic resins and hydrogenated and unhydrogenated rosin esters. It was found, however, that certain resins selected from the class of aliphatic resins or hydrogenated mixed aromatic resins sold under the trade names NEVTAC 115 and Hercules MBG 264 were not effective in improving hydrolytic disbandment resistance. All of the tackifiers, however, provide significant improvement in ESCR and are thus useful and included within the scope of the invention. Examples of aliphatic hydrocarbon resins is that sold by Neville Chemical Company under the trademark "Nevtac 100" which is a polymer made with a $C_5$ alkene. Examples of hydrogenated mixed aromatic resins include polymers made from a $C_5$ alkene cracked from petroleum Naphtha sold under the trademark ESCOREX 1315 by Exxon Chemical. Other tackifiers are commercially available under the trade names PICCOPALE 100, PICCOTAC 115, NEVTAC 100 (as examples of aliphatic resins); REGALITE R125, ARKON P125, NEVEX 100, SUPER NEVTAC 99, LX-1200, LX-1127, ESCOREZ 5300 (as examples of hydrogenated mixed aromatic resins); and ESCOREZ 1315 and ESCOREZ 2101 (as examples of mixed aromatic resins) and FORAL 85-E (as an example of a hydrogenated rosin ester).

Tackifiers which are suitable include
a) terpene resins having a Ring and Ball softening point of about 10–150° C.;
b) aliphatic hydrocarbon resins having a Ring and Ball softening point of about 65–140° C.;
c) Rosin esters having a Ring and Ball softening point of about 65–140° C.;
d) alpha-methylstyrene/vinyl toluene copolymers having a Ring and Ball softening point of about 75–120° C.;
e) polystyrene resins having a Ring and Ball softening point of about 25–100° C.;
f) terpene-phenolic resins having a Ring and Ball softening point of about 80–135° C.;
g) rosin;
h) aromatic hydrocarbon resins having a Ring and Ball softening point of about 40–160° C.; and
i) terpene-urethane resins having a Ring and Ball softening point of about 80–135° C.; as determined by ASTM E-28-58T.

These tackifiers are known products available from commercial sources. The rosin tackifiers are described in, for example, the Kirk-Othmer Encyclopedia of Chemical Technology, Interscience Publishers, Second Edition, vol. 17, pages 475–509. The terpene resins are generally prepared by the polymerization of terpene hydrocarbons using Friedel-Crafts catalysts at moderately low temperatures and are available commercially as Nirez resins sold by Reichhold Chemical Co. while Piccolyte resins are sold by Hercules Chemical Corp. Aliphatic hydrocarbon resins are prepared by polymerizing monomers consisting primarily of 5 carbon atom olefins and diolefins. Examples include WINGTAC® sold by Goodyear and STA-TAC® sold by Reichhold. Rosin esters are prepared by esterfying a rosin acid with a di-, tri, or tetra-hydroxy aliphatic alcohol such as ethylene glycol, propylene glycol, glycerin, or pentaerythritol. Rosin acids can be any standard grade sold in commerce. The rosin esters and saturated versions thereof are especially suitable for metal coating compositions exposed to cathodic disbandment conditions—pipelines may be protected cathodically with impressed current which subjects any coating to cathodic disbandment.

In the present case, the coating compositions containing the rosin esters or hydrogenated versions thereof are resistant to cathodic disbondment. Thus, the present invention is directed to a method of improving resistance to cathodic disbondment in metal pipes subject to such conditions, comprising adding a rosin ester tackifier to a coating composition comprising (i) to form a metal coating composition consisting essentially of (i) and (ii) wherein (i) is selected from the modified polyolefins recited herein with at least one optional modified or unmodified polyolefins or blends thereof and (ii) is a rosin ester or hydrogenated version thereof as described herein.

The coating compositions of the invention are typically prepared by melt blending a suitable amount of the modified polyolefin optionally blended with at least one modified or unmodified polyolefin and optional additives such as an antioxidant and UV stabilizer with a suitable amount of the tackifier in typical plastic processing equipment such as a Brabender Plasticorder, Farrel Continuous Mixer, single or twin screw extruders. The coating composition may be applied in powder form, as a film or applied directly from pellets to the substrate using extrusion coating techniques. When used in powder form, the standard techniques of fluidized bed, electrostatic spraying or rotational moulding may be used.

The process of making a coated metal substrate according to the invention comprises,
(1) preparing a coating composition having the composition described above and
(2) applying said composition to a metal substrate to form a coated metal substrate.

The addition of the tackifier to form the coating composition provides increased ability of the coated metal substrate to avoid adhesive separation due to the presence of moisture or water. Without being bound by theory, it is possible that the tackifier somehow prevents the interaction of a water molecule(s) with the maleic anhydride-metal interface and thus prevents the eventual weakening of the adhesive bonds due to exposure to moisture. This is in contrast to the normal expected properties of tackifiers which is to modify adhesiveness directly rather than indirectly through the interaction with water and/or the metal-anhydride bond. The coating composition may be applied to a metal sheet or to the exterior or interior of a metal pipe or cylinder or to both surfaces of the metal substrate. Additional layers of metal and/or polymeric material may also be applied to a two layer substrate comprising the coating composition and the metal. The customer may select a particular composition having a particular class of tackifier depending upon the ultimate properties and use envisioned and more than one tackifier may be utilized in the coating composition.

The metal substrates utilized as the pre-coating substrate are selected from the wide range of available metals such as iron, copper, steel, alloys and the like which are formed into articles which are utilized as structural or transport materials. For example, pipes or steel sheeting or the like are particularly preferred metal substrates. The coating may be applied to the exterior or interior of the piping or both.

EXAMPLES

The following table (Table 1) provides the coating compositions prepared herein. The results provided following the table demonstrate the effect of different tackifiers on disbondment under various conditions. Disbondment is a visual measurement of adhesive failure over a given period of time in a certain x'd out area of a coated metal substrate formed according to the procedure described below. The examples are considered to be non-limiting in that the resin blends maybe blended in different percentages according to the desire of the customer and depending upon the metals used and the application of the coated metal substrate in the field.

TABLE 1

| Example | Tackifier (wt. %) | Composition(s) |
|---|---|---|
| 1 | Nevtac 100 (20%) | a |
| 2 | Nevtac 115 (20%) | a |
| 3 | Escorez 5300 (20%) | a |
| 4 | Escorez 1315 (20%) | a |
| 5 | Escorez 2101 (20%) | a |
| 6 | Escorez 1315 (5%) | b1 |
| 7 | Escorez 1315 (10%) | b2 |
| 8 | Escorez 1315 (20%) | b3 |
| 9 | Nevtac 100 (5%) | b4 |
| 10 | Nevtac 100 (10%) | b5 |
| 11 | Nevtac 100 (20%) | b6 |
| 12 | Piccotac 115 (20%) | c |
| 13 | LX1127 (20%) | c |
| 14 | Nevex 100 (20%) | c |
| 15 | SuperNevtec 99 (20%) | c |

TABLE 1-continued

| Example | Tackifier (wt. %) | Composition(s) |
|---|---|---|
| 16 | LX1200 (20%) | c |
| 17 | Nevtec 100 (20%) | c |
| 18 | Nevtac 100 (10%) | d1 |
| 19 | Nevtec 100 (20%) | d2 |
| 20 | Nevtec 100 (30%) | d3 |
| 21 | Piccotac 115 (20%) | d2 |
| 22 | LX-1127 (20%) | d2 |
| 23 | Nevex 100 (20%) | d2 |
| 24 | SuperNevtac 99 (20%) | d2 |
| 25 | LX-1200 (20%) | d2 |
| 26 | Nevtac 100 (20%) | d2 | a=LLDPE, ethylene/butene/octene, 0.919 g/cc, 14 MI dg/min(60 wt. %); VLDPE, ethylene/butene/propylene, 0.895 g/cc, 12 MI (20 wt. %) and LLDPE, 0.920 g/cc grafted with 1.0% maleic anhydride, 3 MI (16 wt. %) and 4% antioxidant blend.

b1-6=LLDPE, ethylene/butene/octene, 0.919 g/cc, 14 MI ( 61, 56, 46, 61, 56, 46 wt. %); VLDPE, ethylene/butene/propylene, 0.895 g/cc, 12 MI (20 wt. %) and HDPE, 0.956 g/cc, grafted with 0.9% maleic anhydride 11 MI (10 wt. %) and 4% antioxidant blend.

c=VLDPE, ethylene/butene/propylene, d0.895 g/cc, 12 MI, (20%); LLDPE ethylene/octene, 0.917 g/cc, 25 MI (25%); LLDPE, ethylene/butene, 0.924 g/cc, 5 MI (20%); HDPE, 0.956 g/cc, grafted with 0.9% maleic anhydride 11 MI (10 wt. %) and 5% antioxidant blend.

d1-3=LLDPE, ethylene/butene, 0.924 g/cc, 20 MI (75, 65, 55%); LLDPE grafted with maleic anhydride (0.9%), MI of 11 and density of 0.920 g/cc and 5% antioxidant blend.

The antioxidant described above used contains a phenolic primary antioxidant, a phosphite secondary antioxidant and an ethylene/butene LLDPE. In addition to the antioxidant or antioxidant blend, the composition may contain other conventional excipients which do not materially alter the affect of the tackifier and the modified and unmodified polyolefin blend.

In addition to those specific graft polymeric precursors shown above, other pre-graft polymers may readily be substituted in the above table to form, for example, metallocene grafted components based upon those metallocene polyolefins having a I-10/I-2 ratio of less than 6.53 together with an Mw/Mn of greater than (I-10/I-2)–4.63 or those which have an I-10/I-2 ratio of equal or greater than 6.53 together with an Mw/Mn of equal or less than (I-10/I-2)–4.63. The non-grafted constituents can also be substituted with specific components within the described generic class. The relative weight percentages of the various components can also be varied according to the specific properties desired in the coating composition or layer. The preferred weight percentage of the tackifier is that shown in the table (15–25%).

The compositions described above were prepared by blending the tackifier with the other components in a Brabender Plasticorder. In the compositions containing component a, the blends were pressed into films and bonded onto mild steel plates which had previously been cleaned with trichloroethane. The coating was formed by placing the film on the metal plate (substrate) (between TEFLON® release sheets) in a hot press at 180° C. for five minutes, and then pressed at 351.5 kg/cm2 (5,000 psi) for one min. The coated metal substrate was then air cooled. An inscription in the form of an "X" was then made in the coating with a utility knife to expose bare metal. The plates were then placed in a 65° C. hot water bath to examine the condition of the coating(s).

In runs 1–5, using examples 1–5, the adhesion results were the following:

1) A few tiny bubbles appeared in the film surface at 111 days. No disbondment around "X" after 297 days. A small area of the coating underneath the bubble was scraped away, adhesion was still good and the metal was still protected underneath.
2) Some disbandment occurred around the "X" after 18 hours. Large bubbles appeared in the coating surface at 66 days. Adhesion failure at 126 days.
3) Some disbondment around the "X" was observed after 18 hours. A few tiny bubbles appeared in the coating around 111 days. The coating was still protecting metal at 297 days, although the adhesion was not very strong.
4) No disbandment was observed around "X" at 297 days. A small area was scraped, adhesion was still good and no rusting of the metal underneath was detected.
5) A few tiny bubbles were detected in coating after 111 days. The coating was full of bubbles at 148 days. When coating was pulled away from metal black spots were found. As is evident, the tackifiers affected adhesiveness in the following order: ESCOREZ 1315, NEVTAC 100, ESCOREZ 5300, ESCOREZ 2101 and NEVTAC 115.

Accelerated Hot Salt Water Test

Composition a, Examples 1 and 3 from Table 1 were separately coated on pieces of a corroled steel plate. The metal was placed in a muffle furnace at 300° C. for twenty minutes and then air cooled. Polymer plaques of approximately 120 mils. thick were placed on top of the metal pieces and then melted in a muffle firnace at 230° C. for ten minutes and then air cooled. The coated metal substrates were then placed in a 5% NaCl solution at 80° C. The conditions of the coatings were inspected periodically:

TABLE 2

| Sample | Coating thickness | 1 day | 32 days | 35 days |
|---|---|---|---|---|
| Ex 1 | 100 mils | No adhesive failure | no change | adhesive failure only when pried with screwdriver |
| Ex 3 | 103 mils | No adhesive failure | no change | adhesive failure only when pried with screwdriver |
| a | 79 mils | some adhesive failure | coating can easily be pulled off by hand | |

The results in Table 2 show that use of the tackifier in the coating composition improves adhesiveness under harsh, aqueous conditions relative to an identical or similar composition which does not have a tackifier.

The data presented in Table 3, below, demonstrates the effect of various concentrations of tackifier in the coating compositions relative to a control which doesn't have a tackifier. The Control has the same composition as Example 9 without the tackifier except with 66% LLDPE instead of 61%. 70 mil plaques of examples 6–11 were prepared along with the control. The metal substrates were mild steel plates which were cleaned with a solvent such as hexachloroethane and then heat treated in a muffle furnace at 300° C. for twenty minutes and then air cooled. The plaques were placed on top of heat treated metal and the assembly placed in the muffle furnace at 230° C. for 10 minutes and air cooled. The samples were then placed in an 80° C., 5% NaCl water bath.

TABLE 3

| Example | Time | Adhesion rating |
|---|---|---|
| control | 3 days | 1 |
| 6 | 3 days | 3 |
| 9 | 3 days | 2 |
| 7 | 3 days | 6 |
|  | 4 days | 5 |
| 10 | 4 days | 6 |
|  | 7 days | 5 |
|  | 21 days | 4 |
| 8 | 7 days | 6 |
|  | 21 days | 4 |
| 11 | 7 days | 7 |
|  | 36 days | 8 |

In the above Table, the ratings are as follows: 1—entire coating can be pulled off by hand; 2—over 90% of coating can be pulled off by hand; 3—about 50% of coating can be pulled off by hand; 4—coating can be pried from metal; 5less than 25% of the coating is disbonded; 6—slight disbondment at edges; 7—very slight disbondment at edges; 8—no adhesive failure when pried.

The above results show that the performance of the coating composition on a metal substrate is most preferred with, for example, 20 wt. % NEVTAC 100. They further demonstrate that incorporation of a tackifier at any of the percentages performs better than an identical or similar composition without the tackifier.

Examples 12–26 were subjected to environmental stress crack resistance tests and compared to control samples which did not have the incorporated tackifier. Environmental Stress Crack Resistance tests are generally used to measure a materials ability to resist chemical or environmental degradation. The longer the material resists or doesn't fail, the better the ESCR. Typical measurements document when 50% of the samples fail over time. ASTM D1693 is a common test method. The sample is notched or stressed by bending it in a controlled or predetermined "U" shape and then immersed in a liquid (detergent, oil, fat etc.) and then the test measures the time at which 50% of the samples fail (i.e., break). Normally, high molecular weight is associated with high environmental stress crack resistance. In addition, a broad molecular weight distribution (MWD) is associated with high ESCR. Under normal conditions, environmental stress cracking is the development of cracks, small cracks, in the plastic or composition or layer on exposure to substances such as liquids (detergents, fats, oils etc.) which may ultimately, over time, lead to failure of the layer.

TABLE 4

| Example | ESCR (F50) |
|---|---|
| Comp. 1 | 445 hr |
| 12 | 500 hr |
| 13 | 860 hr |
| 14 | FO = 1200 hr |
| 15 | FO = 1200 hr |
| 16 | F5 = 1200 hr |
| 17 | F5 = 1200 hr |
| Comp. 2 | F50 = 1.5 hr |
| 18 | F50 = 1.3 hr |
| 19 | F50 = 70 hr |
| 20 | F50 = 49 hr |
| Comp. 3 | F50 = 1.5 hr |
| 21 | F50 = 5 hr |
| 22 | F50 = 4.5 hr |
| 23 | F50 = 100 hr |
| 24 | F50 = 38 hr |
| 25 | F50 = 2.3 hr |
| 26 | F50 = 70 hr |

Note - F50 means time at which 50% of the samples fail etc.
Comparative 1 (comp. 1) = composition c except with 45% LLDPE (d, 0.917) and no tackifier;
Comparative 2 and 3 (comp. 2 and 3) = composition d except with 85% LLDPE (d, 0.924) and no tackifier.

The Environmental Stress Crack Resistance (ESCR) was measured using the ASTM method D1693, condition A. The test specimens were cut from compression molded plaques made from pellets. The resins were placed inside a 125 mil steel frame between Teflon sheets. The assembly was heated to 177° C. for 5 min., pressed at 20,000 psi. for 5 min. and then cooled under pressure at a rate of 12 to 15° C./min. The plaque was then conditioned under ambient conditions for 24 hrs., and the test specimens cut and notched. The ESCR measurement was carried out in 100% Igepal C0630 solution with a bath temperature of 50° C. The table of results on ESCR show that significant improvements of ESCR can be achieved when tackifiers are incorporated in the compositions, particularly at high addition level (e.g., 20%).

The following table shows examples of improvement of cathodic disbondment when rosin ester tackifiers are utilized in the coating compositions and coated onto metal substrates to form a coated metal substrate having improved cathodic disbondment and adhesion.

TABLE 5

| Example | Tackifier* | D (wt. %) | I (wt. %) | F (wt. %) | K (wt. %) | CD (mm) |
|---|---|---|---|---|---|---|
| 27 | FORAL 85 (20%) | 41 | 15 | 20 | 4 | 8 |
| 28 | PENTALYN H (20%) | 41 | 15 | 20 | 4 | 9 |
| 29 | STABELITE ESTER 10 (20%) | 41 | 15 | 20 | 4 | 10 |
| 30 | FORALYN 110 (20%) | 41 | 15 | 20 | 4 | 9 |
| 31 | FORALYN 90 (20%) | 41 | 15 | 20 | 4 | 9 |
| 32 | FLORAL 105 (20%) | 41 | 15 | 20 | 4 | 8 |
| Comp. A | — | 61 | 15 | 20 | 4 | 20 |
| Comp. B | — | 56 | 20 | 20 | 4 | 22 |
| 33 | PENTALYN H (20%) | 36 | 20 | 20 | 4 | 11 |
| 34 | PENTALYN C (20%) | 36 | 20 | 20 | 4 | 11 |
| 35 | PERMALYN 3100 (20%) | 36 | 20 | 20 | 4 | 11 |

TABLE 5-continued

| Example | Tackifier* | D (wt. %) | I (wt. %) | F (wt. %) | K (wt. %) | CD (mm) |
|---|---|---|---|---|---|---|

D = LLDPE, ethylene/butene/octene, 0.919 g/cc, 14 MI
I = mLLDPE (metallocene produced as supplied by EXXON, 0.917 g/cc) grafted with 1.0% maleic anhydride, 5 MI
F = VLDPE, ethylene/butene, 0.901 g/cc, 5 MI
K = antioxidant blend
* = tackifiers obtained from HERCULES INC. of Wilmington, DE
CD = cathodic disbondment radius (mm)

Cathodic Disbondment measurements: A 120 mil thick 5"×5" mild steel plate was washed with acetone to get rid of the surface oil. It was then blasted with steel shot to a near white finish. The blasted surface was again washed with acetone and air dried. The steel plate was then placed inside of a 160 mil steel frame on a TEFLON® (E.I. du Pont de Nemours and Company) sheet followed by another brass plate. The whole assembly was then placed in a hot press, heated to 230° C. for 5 min. and then pressed for 1 min. under 5 tons pressure. The coated plate was air cooled. A 5/32" holiday was drilled through the coating in the center of the plate. A glass cylinder with an internal diameter of about 3.5" and a height of 4.5" was placed on the coating and sealed in place with a Silicone sealant and allowed to cure overnight. 500 ml. of 3% NaCl solution was added to the cell. The plate was then connected to the negative terminal of a rectifier, and a platinum electrode was used as the anode. The potential of the plate was measured relative to the calomel electrode and was kept at −1.5V. The whole assembly was partially immersed in a hot water bath, with the bath temperature kept at 65° C. The disbonded radius was determined after 48 hrs.

The data in the above table demonstrates that the incorporation of the rosin resin tackifiers and hydrogenated rosin esters improve the resistance of the coating compositions toward cathodic disbondment. The comparative examples (absent tackifier) all show higher (greater) cathodic disbondment than the coatings of the invention.

Examples 32, 33 and 34 were also subjected to adhesion tests on a coated metal 2.54 cm wide strip with open edges. The data reflects peel strength measured in N/cm after the indicated period in de-ionized water at 80° C. For Comp. B in Table 5, the comparative example, adhesion at 0 hr, 1 week and 4 weeks was 133, 45 and 6. For example 33 at the same duration the results were 95, 93 and 9; for example 34, the results were 129, 102 and 77 and for example 35, the results were 99, 126 and 91. This data suggests that the compositions containing rosin tackifier were more resistant to disbandment than the same composition absent the tackifier under the hot aqueous environment (e.g., less change over time).

What is claimed is:

1. A coated metal substrate comprising:
   (a) an adhesive coating composition consisting essentially of
      (i) a modified polyolefin selected from a maleic anhydride grafted conventional or metallocene linear low density polyethylene or from a maleic anhydride grafted conventional or metallocene high density polyethylene
      (ii) at least one tackifier and
      (iii) optionally one or more additional modified or unmodified polyolefin; and
   (b) a metal substrate;
   wherein, for element (a), the tackifier is present in a weight percentage relative to the combined weight of (i), (ii) and (iii) of about 15–25% and (i) contains the at least one additional unmodified polyolefin.

2. The coated metal substrate according to claim 1 wherein the one or more additional unmodified polyolefin is selected from an ethylene/butene/propylene terpolymer, an ethylene/octene copolymer, an ethylene/butene copolymer, an ethylene/butene/octene terpolymer or an ethylene/hexane copolymer or mixtures thereof.

3. The coated metal substrate according to claim 1 wherein the tackifier is selected from aliphatic resins or hydrogenated mixed aromatic resins or from mixed aromatic resins or from rosin esters or hydrogenated versions thereof.

4. A method of improving the environmental stress crack resistance of a coating composition, comprising
   (a) adding a tackifier to a metal coating composition comprising a modified polyolefin optionally containing one or more additional modified or unmodified polyolefin or to a non-metal coating composition comprising a modified polyolefin optionally containing one or more additional modified or unmodified polyolefin to form a composition consisting essentially of the modified polyolefin optionally containing one or more additional modified or unmodified polyolefin and the tackifier wherein said tackifier improves the environmental stress crack resistance of the coating composition according to ASTM D-1693, wherein the modified polyolefin is selected from a malefic anhydride grafted conventional or metallocene linear low density polyethylene or from a maleic anhydride grafted conventional or metallocene high density polyethylene.

5. The method according to claim 4 wherein the tackifier is selected from aliphatic resins or hydrogenated mixed aromatic resins or from mixed aromatic resins or from rosin esters or hydrogenated versions thereof.

6. The method according to claim 4 wherein the one or more unmodified polyolefin is selected from an ethylene/butene/propylene terpolymer, and ethylene/octene copolymer, an ethylene/butene copolymer, an ethylene/butene/octene terpolymer on an ethylene/hexene copolymer or mixtures thereof.

7. A method of improving the resistance of a composition to cathodic disbondment, comprising
   (a) adding a rosin ester tackifier to metal coating compositions comprising element (i) according to claim 1 to form a composition consisting essentially of (i) and the rosin tackifier wherein said composition is resistant to cathodic disbondment.

8. A process of making a coated metal substrate, comprising
   (1) preparing a coating composition having the composition according to claim 1 and
   (2) applying said composition to a metal substrate to form a coated metal substrate.

* * * * *